Sept. 13, 1960
G. L. CAMARERO
2,952,443
VEHICLE JACK
Filed Aug. 25, 1958
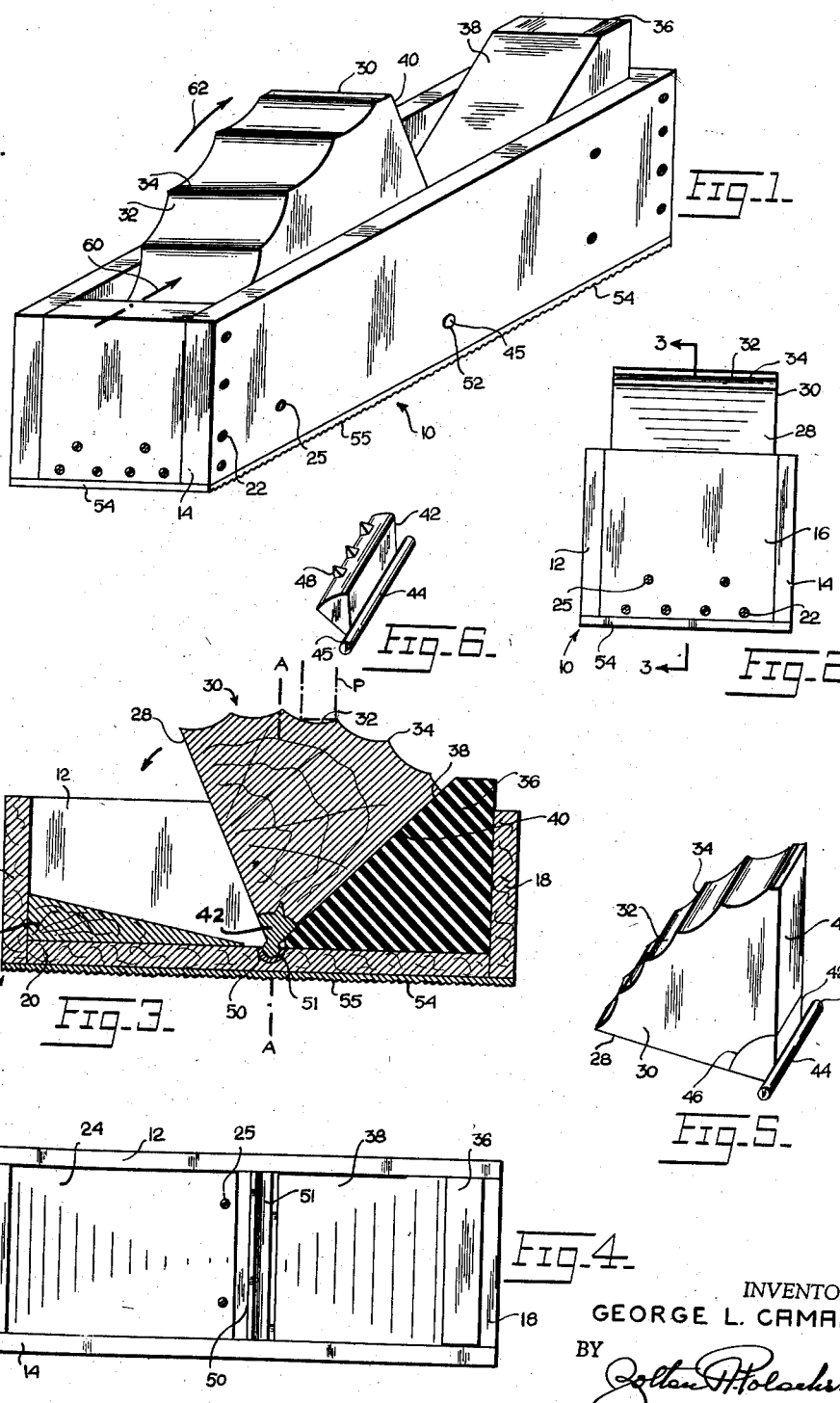
INVENTOR.
GEORGE L. CAMARERO
BY
ATTORNEY United States Patent Office 2,952,443
Patented Sept. 13, 1960

2,952,443
VEHICLE JACK
George L. Camarero, 47 W. 57th St., New York, N.Y.
Filed Aug. 25, 1958, Ser. No. 756,809
2 Claims. (Cl. 254—94)

This invention relates to the art of vehicle jacks and particularly concerns a jack operable by the motor of the vehicle to raise a portion of the vehicle for service or repair.

According to the invention there is provided a cradle adapted to grip the pavement while a vehicle is driven onto the device. A pivotally mounted chock disposed in a cradle is engaged by a bumper, axle or other portion of the vehicle and is angularly rotated. As the chock is pivoted the vehicle is lifted. The lifted vehicle is held safely and securely for servicing. After completion of servicing the vehicle is driven in the opposite direction to disengage the chock.

It is, therefore, a principal object to provide a device operable by motive power supplied by a vehicle to lift or jack up a portion of the vehicle.

It is a further object to provide a chock pivotally mounted in a cradle adapted to grip the pavement during the lifting operation.

It is a still further object to provide a rectangular box-like cradle containing a pivotally mounted scalloped chock adapted to engage a portion of a vehicle driven onto the chock for lifting the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the device embodying the invention.

Fig. 2 is an end view of the device with the chock in an angularly tilted position.

Fig. 3 is a sectional view taken on line 3—3 of Fig. 2.

Fig. 4 is a top plan view of the cradle of the device with the chock removed.

Fig. 5 is a perspective view of the chock.

Fig. 6 is a perspective view of an apical bearing member adapted for use with the chock.

In Figs. 1–4 there is shown a rectangular cradle in the form of an open-topped box 10 made of wood panels. The box has sides 12, 14, front 16, rear 18 and bottom 20. The several panels which define the box are secured together by countersunk screws 22. Mounted inside the box at the front is a wooden or stiffly resilient rubber wedge 24. This wedge provides an inclined platform upon which the leading side 28 of chock 30 rests when the chock is disposed in the position shown in Fig. 1. Wedge 24 is held removably in the box by countersunk screws 25.

The chock 30 has generally the form of a sector of a flat cylinder, as best shown in Fig. 5. The curved outer side being transversely grooved, fluted or scalloped with concave portions 32 and apical portions 34. The axial width of the chock is slightly less than the interior width of the box 10.

At the rear end of the box is disposed a pillow block 36 made of resilient material such as natural or artificial rubber or plastic. This block has an inclined forward side 38 adapted to receive and cushion the rear side 40 of the chock, as best shown in Fig. 3.

At the apical end of the chock is disposed a metal bearing member 42. This member, as clearly shown in Fig. 6, has an apical axial shaft 44 with end extensions 45. The bearing member is a sector of a cylinder and fits into a concave apical recess 46 in the chock. The member 42 is formed with a plurality of outwardly extending spikes 48 by means of which the member is secured to the chock. The chock 30 is preferably made of hardwood and the member 42 serves as both a bearing member and as a shock absorber for the chock.

In the bottom 20 of the box is a transversely disposed groove 50 lined with a metal semicylindrical channel bearing member 51 in which is journaled the shaft 44. Apertures 52 are provided in the sides 12 and 14 and the shaft extensions 45 extend into these apertures to lock the chock pivotally in the box.

The panels making up the sides, front, rear and bottom of the box are preferably made of hardwood but they could be made of metal or other suitable rigid material.

Secured to the bottom of the box is a metal plate 54 having a roughened outer surface 55 so that the device frictionally grips the pavement or road when in use.

In operation of the device, the chock 30 will be in the forward position shown in Fig. 1 with the chock resting on wedge 24. The vehicle will be driven in the direction indicated by arrow 60 until a portion engages one concavity of the chock. The vehicle will continue to be driven to cause the chock to pivot angularly as indicated by arrow 62 until the line A—A indicated in Fig. 3 is passed by the supported vehicle portion P. The vertical line A—A includes the center of shaft 44 which acts as a fulcrum for the lever-like action of the chock in causing the vehicle to be lifted as the chock is pivoted. It will be noted that the concavity 32 engaged by vehicle portion P has a higher elevation with respect to the bottom of the box in the raised chock position of Figs. 2 and 3 than in the lower starting position of Fig. 1. The vehicle is thus lifted on the device for servicing. The lifted portion P of the vehicle is held securely and safely solely by its own weight on the chock. To be released from the device, the vehicle must be driven in a reverse direction to pivot the chock to the forward position of Fig. 1.

The device is adapted for jacking up automobiles, buses, trucks, and other vehicles of like character. It can be made in large or small sizes to suit the types of vehicles for which it is to be used. The device is simple and rugged in structure with only a single moving element. Since no gears, hydraulic mechanisms or other complex mechanical features are required, the device is economical to manufacture.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A vehicle jack, comprising a cradle in the form of an open top having side, front, rear and bottom panels joined together and defining a rectangular compartment, a wedge disposed in a forward portion of the compartment and having an upper side inclining downwardly from the front panel toward the bottom panel, a resilient block disposed in a rear portion of the compartment and having a forward side inclined downwardly from the rear panel toward the bottom panel, a semicylindrical channel bearing member disposed transversely across the compartment in said bottom panel between lowermost ends of the wedge and block, and a wedge-like chock having a fluted curved outer side for selectively engaging a portion of said vehicle for elevating said portion, said chock being pivotally mounted at the apical end thereof in said channel bearing member, said apical end of the chock being formed with a shaft thereon, said shaft having portions extending outwardly from opposite flat sides of the chock, said side panels having apertures rotatably receiving the extended portions of the shaft, and a plate having an outer roughened surface secured to the bottom panel for frictionally gripping a supporting pavement.

2. A vehicle jack comprising an elongated rectangular-shaped box having side, end and bottom panels and open at the top, a roughened plate covering the outer surface of the bottom panel, a wedge block on the inner surface of the bottom panel at one end of the box, the top surface of said wedge disposed below the top edge of the side and end panels, and facing the other end of the box, a pillow block on the inner surface of the bottom panel at the other end thereof, said pillow block having a slanting surface facing said one end of the box, the top end of said slanting surface disposed above the top edge of the adjacent end panel, a semicylindrical bearing member mounted on the inner surface of the bottom panel between the inner adjacent ends of the wedge block and pillow block, and a chock device pivotally mounted in the semicylindrical bearing member, said device having a wedge-shaped body, the curved peripheral edge of the body having transverse grooves to receive a portion of a vehicle, the apical end of the body mounting a transverse shaft round in cross section for rotating in said semicylindrical bearing member, the top peripheral edge of said chock device protruding above the top edges of the panels of the box, said wedge and said pillow block disposed in the path of movement of said chock device.

References Cited in the file of this patent

UNITED STATES PATENTS

| | | |
|---|---|---|
| 560,048 | Staples | May 12, 1896 |
| 1,687,503 | McKee | Oct. 16, 1928 |